US008743716B2

(12) United States Patent
Ree et al.

(10) Patent No.: US 8,743,716 B2
(45) Date of Patent: Jun. 3, 2014

(54) SYSTEMS, METHODS, AND APPARATUS FOR IDENTIFYING INVALID NODES WITHIN A MESH NETWORK

(75) Inventors: Bradley Richard Ree, Cumming, GA (US); John Christopher Boot, Sandy Springs, GA (US)

(73) Assignee: General Electric Company, Schenectady, NY (US)

( * ) Notice: Subject to any disclaimer, the term of this patent is extended or adjusted under 35 U.S.C. 154(b) by 574 days.

(21) Appl. No.: 13/021,176

(22) Filed: Feb. 4, 2011

(65) Prior Publication Data
US 2012/0201145 A1    Aug. 9, 2012

(51) Int. Cl.
*H04L 12/26* (2006.01)
*G08B 23/00* (2006.01)
*G08B 25/00* (2006.01)
*G06F 15/173* (2006.01)

(52) U.S. Cl.
USPC ...... 370/252; 370/328; 370/338; 340/870.02; 340/870.09; 709/223

(58) Field of Classification Search
USPC .................. 370/245, 246, 252, 254–255; 709/223–224
See application file for complete search history.

(56) References Cited

U.S. PATENT DOCUMENTS

| 7,606,210 | B2 * | 10/2009 | Ratiu et al. ................... 370/338 |
| 7,825,793 | B1 * | 11/2010 | Spillman et al. ........... 340/539.1 |
| 8,026,830 | B2 * | 9/2011 | Womble et al. ........... 340/870.02 |
| 8,390,473 | B2 * | 3/2013 | Krzyzanowski et al. 340/870.02 |
| 8,451,739 | B2 * | 5/2013 | van Greunen et al. ........ 370/242 |
| 2005/0251401 | A1 | 11/2005 | Shuey |
| 2006/0055529 | A1 * | 3/2006 | Ratiu et al. ................. 340/539.1 |
| 2008/0186871 | A1 | 8/2008 | Trevino et al. |
| 2008/0219210 | A1 | 9/2008 | Shuey et al. |
| 2009/0146838 | A1 * | 6/2009 | Katz ........................ 340/870.02 |
| 2009/0315699 | A1 * | 12/2009 | Satish et al. .................. 340/533 |
| 2011/0050455 | A1 * | 3/2011 | Addy ....................... 340/870.02 |
| 2012/0062390 | A1 * | 3/2012 | Solomon .................. 340/870.03 |

FOREIGN PATENT DOCUMENTS

| NZ | 530254 A | 10/2006 |
| WO | 2009/067252 A1 | 5/2009 |

OTHER PUBLICATIONS

Search Report issued in connection with EP Patent Application No. 12153650.2, Apr. 12, 2012.
New Zealand Office Action issued in connection with NZ Patent Appircation No. 598026, Feb. 13, 2012.

* cited by examiner

*Primary Examiner* — Candal Elpenord
(74) *Attorney, Agent, or Firm* — Sutherland Asbill & Brennan LLP

(57) ABSTRACT

Systems, methods, and apparatus for identifying, invalid nodes within a mesh network are provided. A routing table may be maintained by a utility meter. The routing table may include information associated with one or more devices in communication with the utility meter via a mesh network. A change in the routing table may be identified by the utility meter, and an alert message associated with the identified change may be generated by the utility meter. The generated alert may then be output by the utility meter for communication to a central controller configured to process the alert message to identify an invalid node within the mesh network.

17 Claims, 3 Drawing Sheets

| Routing Table |
|---|
| Meter B |
| Meter C |
| Meter D |
| Meter E |

SYSTEMS, METHODS, AND APPARATUS FOR IDENTIFYING INVALID NODES WITHIN A MESH NETWORK

FIELD OF THE INVENTION

Embodiments of the invention relate generally to mesh networks, and more specifically to systems, methods, and apparatus for identifying invalid nodes within a mesh network.

BACKGROUND OF THE INVENTION

Mesh networks are utilized in a wide variety of applications to route data between mesh device nodes within the network. For example, mesh networks are utilized in utility applications to route data between utility meters, such as electrical meters. A mesh network allows for continuous connections and reconfigurations around broken or blocked paths by retransmitting messages from node to node until a destination is reached. In some applications, an Advanced Metering Infrastructure ("AMI") is combined with a mesh network in order to facilitate communication of utility meter data, such as usage data.

A common technique utilized to steal data within a mesh network is a man in the middle attack in this type of attack, a compromised node or an invalid node is inserted into the network data flow. Although the invalid node forwards traffic in a similar manner as other nodes, the invalid node also typically copies data or communicates data to other locations for subsequent decryption and analysis. Accordingly, systems, methods, and apparatus for identifying invalid nodes within a mesh network are desirable.

BRIEF DESCRIPTION OF THE INVENTION

Some or all of the above needs and/or problems may be addressed by certain embodiments of the invention. Embodiments of the invention may include systems, methods, and apparatus for identifying invalid nodes within a mesh network. According to one embodiment of the invention, there is disclosed an apparatus, such as a utility meter, configured to facilitate the identification of an invalid node within a mesh network. The utility meter may include at least one network interface device, at least one memory, and at least one processor. The at least one network interface device may be configured to facilitate communication over a mesh network. The at least one memory may be configured to store a routing table comprising information associated with one or more devices in communication with the utility meter via the mesh network. The at least one processor may be configured to (i) identify a change in the routing table, (ii) generate an alert message associated with the identified change, and (iii) direct communication of the alert message to a central controller. The central controller may be configured to process the alert message to identify an invalid node within the mesh network.

According to another embodiment of the invention, there is disclosed a method for identifying an invalid, node within a mesh network. A routing table may be generated by a utility meter. The routing table may include information associated with one or more devices in communication with the utility meter via a mesh network. A change in the routing table may be identified by the utility meter, and an alert message associated with the identified change may be generated by the utility meter. The generated alert may then be output by the utility meter for communication to a central controller configured to process the alert message to identify an invalid node within the mesh network.

According to another embodiment of the invention, there is disclosed a system for identifying an invalid node within a mesh network. The system may include a plurality of utility meters and a central controller. The plurality of utility meters may be in communication with one another via a mesh network, and each utility meter may include a routing table configured to store information associated with other utility meters in communication with the utility meter. The central controller may be configured to (i) receive, from one of the plurality of utility meters, an alert message associated with an identified change in the routing table of the utility meter, and (ii) identify, based upon an analysis of the alert message, an invalid node associated with the mesh network.

Additional systems, methods, apparatus, features, and aspects are realized through the techniques of various embodiments of the invention. Other embodiments and aspects of the invention are described in detail herein and are considered a part of the claimed invention. Other embodiments, features, and aspects can be understood with reference to the description and the drawings.

BRIEF DESCRIPTION OF THE DRAWINGS

Figure 1:
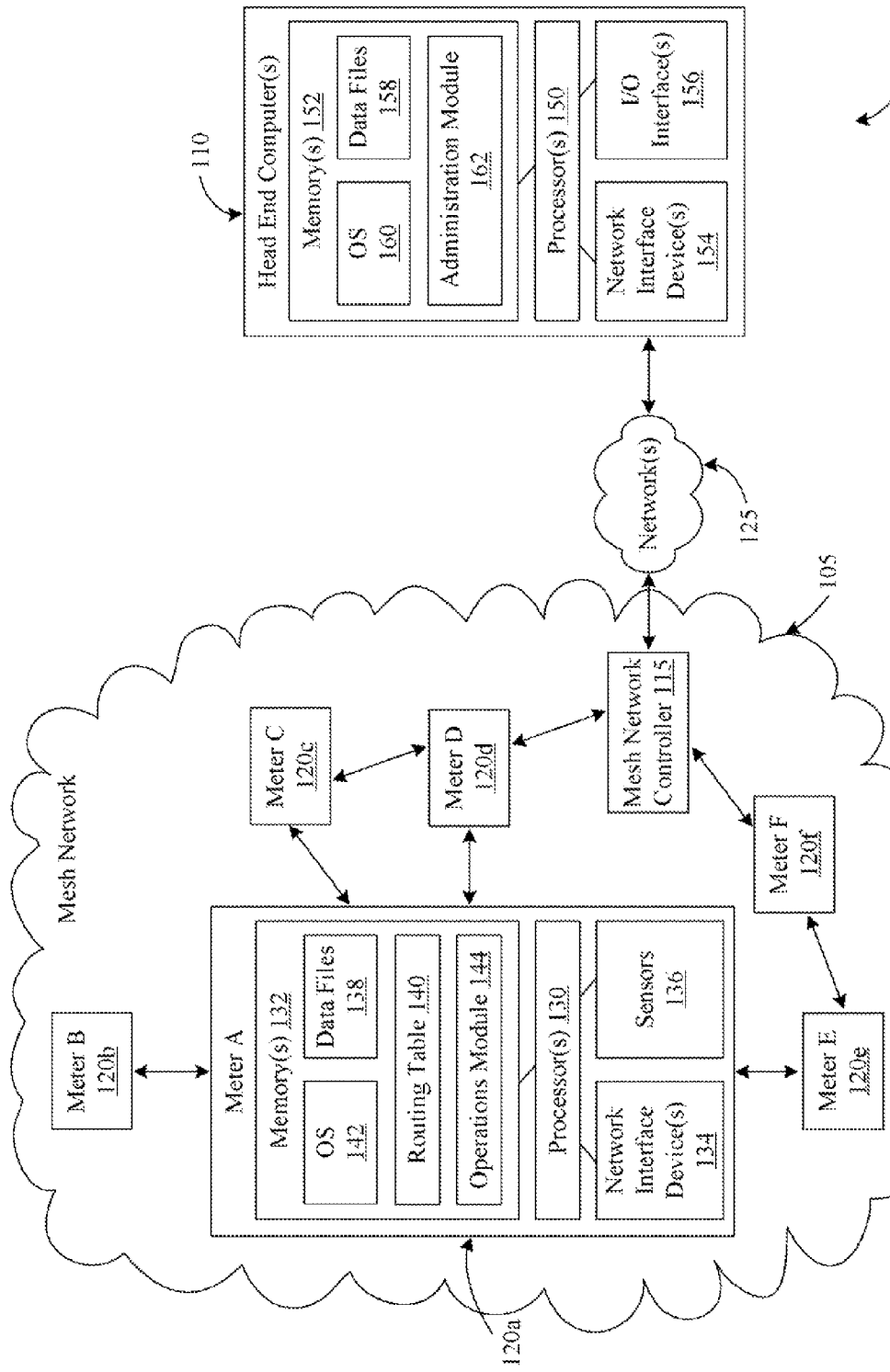

Having thus described the invention in general terms, reference will now be made to the accompanying drawings, which are not necessarily drawn to scale, and wherein:

FIG. 1 is a block diagram of one example system that facilitates the identification of invalid nodes within a mesh network, according to an illustrative embodiment of the invention.

Figure 2:

FIG. 2 is a diagram of an example routing table that may be utilized in accordance with various embodiments of the invention.

Figure 3:
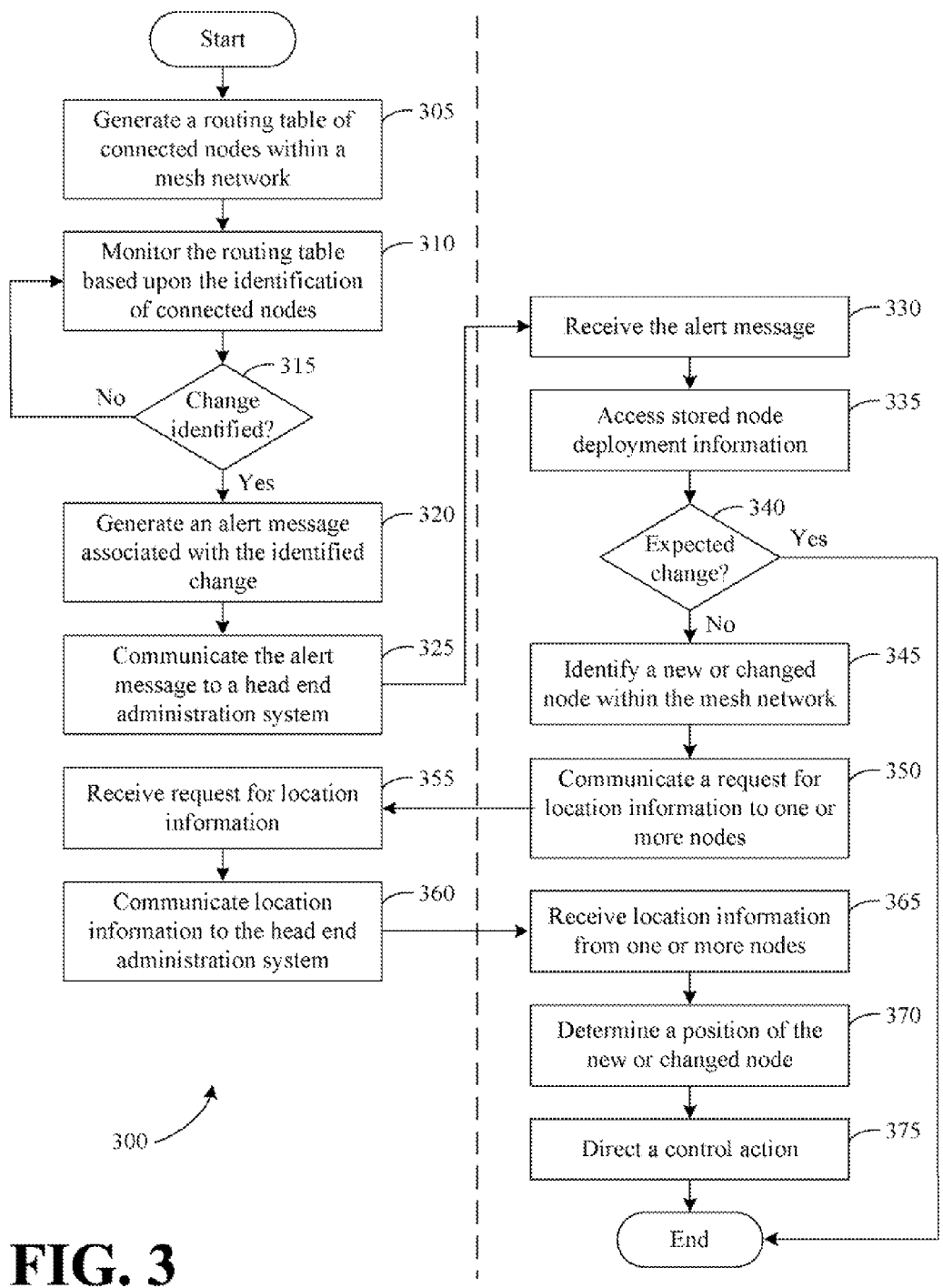

FIG. 3 is a flow diagram of an example method for identifying an invalid node within a mesh network, according to an illustrative embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Disclosed are systems, methods, and apparatus for identifying invalid nodes within a mesh network in one example embodiment of the invention, a plurality of nodes may be provided within a mesh network. For example, a plurality of utility meters and/or a mesh network controller may be provided. Each node may include a routing table that includes information associated with one or more nodes or other devices in communication with the node. Additionally, each node may monitor its routing table and identify changes or alterations within the routing table (i.e., a change in one or more other nodes in communication with the node). Based upon the identification of a change in a routing table, a node may generate an alert message associated with the identified change, and the generated alert message may be output for communication to an external system, such as the mesh network controller and/or a central controller. The alert message may facilitate the identification of an invalid node within the mesh network, such as an invalid node associated with a man in the middle attack. In this regard, security within the mesh network may be enhanced.

A wide variety of suitable controllers may receive and process alert messages output by one or more nodes within the mesh network. For example, a mesh network controller or mesh gate may receive and process alert messages, and the mesh network may determine whether an alert message should be forwarded to a central controller or head end controller. As another example, a central controller, such as a central controller associated with a utility, may receive and process alert messages output by individual nodes e.g., utility meters) and/or mesh network controllers. During the processing of various alert messages, an invalid node associated with the mesh network may be identified. For example, information associated with identified changes in one or more routing tables associated with various nodes may be compared to information associated with a scheduled or expected change, such as the installation of a new node or the removal of a node. Based at least in part upon the comparison, a determination may be made as to whether any invalid or unauthorized nodes have been added to the mesh network. Similarly, a determination may be made as to whether any nodes have been moved within the mesh network. As desired in certain embodiments, the position of an invalid node may also be determined utilizing location information received from one or more nodes.

Various embodiments of the invention may include one or more special purpose computers, systems, and/or particular machines that facilitate the identification of invalid nodes within a mesh network. A special purpose computer or particular machine may include a wide variety of different software modules as desired in various embodiments. As explained in greater detail below, in certain embodiments, these various software components may be utilized to identify an invalid node within a mesh network and/or to determine a position of an identified invalid node.

Certain embodiments of the invention described herein may have the technical effect of identifying an invalid node within a mesh network, such as a mesh network associated with a plurality of utility meters. Additionally, embodiments of the invention may have the technical effect of determining a location of an identified invalid node. In this regard, security within the mesh network may be enhanced. Additionally, man in the middle-type attacks may be identified and addressed.

FIG. 1 is a block diagram of one example system 100 for identifying invalid nodes within a mesh network, according to an illustrative embodiment of the invention. The system 100 illustrated in FIG. 1 may include a mesh network 105 and one or more head end computers 110 or central controllers. The mesh network 105 may include any number of mesh nodes, such as a mesh network controller 115 or mesh gate and a plurality of utility meters 120a, 120b, 120c, 120d, 120e, 120f. The mesh network controller 115 may communicate with the head end computers 110 via any number of suitable networks 125, such as a wide area network ("WAN"). Although a single mesh network 105 is illustrated in FIG. 1, any number of mesh networks may be in communication with the head end computers 110 via the networks 125. Additionally, each mesh network may include any number of mesh nodes or mesh devices. For example, each mesh network may include any number of mesh network controllers and utility meters.

In certain embodiments, the mesh network 105 may include mesh nodes and/or devices associated with an AMI system. For example, utility meters and/or other sensors may be part of an AMI system that monitors utility usage, such as gas, water, and/or electricity usage. As desired, components of the AMI system may communicate with mesh network controllers, and the mesh network controllers may communicate information to monitoring utilities, such as one or more utilities associated with the head end computers 110.

The mesh network 105 may include any number of mesh devices. A mesh device may be any suitable device configured to participate as a node within the mesh network 105, such as the utility meters 120a, 120b, 120c, 120d, 120e, 120f, the mesh network controller 115, mesh repeaters, and/or other mesh nodes. Each mesh node may act as an independent router to allow for continuous connections and reconfiguration around broken or blocked paths by "hopping" from node to node until the destination is reached.

Additionally, as shown in FIG. 1, each mesh node may be in communication with any number of other nodes. For example, the first utility meter 120a may be in communication with the second utility meter 120b, the third utility meter 120c, the fourth utility meter 120d, and the fifth utility meter 120e. A wide variety of communication paths and/or interconnectivity paths may be available within the mesh network. The communication paths illustrated in FIG. 1 are provided by way of example only. Additionally, according to an embodiment of the invention, each mesh node may include a suitable routing table that includes information associated with other nodes in direct communication with the node, such as the nearest neighbors to the node. As desired, a routing table may also include information associated with one or more communication paths to the top of the network, such as information associated with a path to the mesh network controller 115.

As stated above, any number of utility meters may be associated with the mesh network 105. In certain embodiments, each utility meter may be in direct or indirect communication with the mesh network controller 115. Each meter may forward or relay transmissions or communications from other meters within the mesh network to the mesh network controller 115. The mesh network controller 115 may then communicate transmissions or communications to the head end computers 110. Communications may be routed from the head end computers 110 to the meters in a similar manner. Although the meters are described as communicating with the head end computers 110 via the mesh network controller 115, in certain embodiments, one or more meters may be in direct communication with the head end computers 110 via any number of suitable networks and/or communications techniques (e.g., cellular communication, broadband over power line communication, the Internet, another WAN, etc.). Additionally, as desired, one or more of the meters may function as a mesh network controller.

An example utility meter 120a, which may be referred to as utility meter 120, will now be described in greater detail. The utility meter 120 may be any suitable utility meter that may be connected to the mesh network 105, such as a suitable electrical meter, water meter, or gas meter. As such, the utility meter 120 may be configured to measure an amount of utility usage (e.g., electrical usage, etc.) supplied to an associated residence, business, or machine. In certain embodiments, the utility meter 120 may be a smart meter or an advanced meter configured to identify consumption in relatively greater detail than a conventional meter. For example, a smart power meter may facilitate real-time or near real-time readings, power outage notification, and/or power quality monitoring.

The utility meter 120 may include any number of suitable computer processing components that facilitate the general operation of the meter 120 and/or the identification of potentially invalid nodes. For example, the utility meter 120 may include one or more controllers or processing devices configured to monitor a routing table 140, identify one or more changes within the routing table, and/or process identified changes. Examples of suitable processing devices that may be incorporated into a utility meter 120 include, but are not limited to, application-specific circuits, microcontrollers, minicomputers, other computing devices, and the like. As such, the utility meter 120 may include any number of processors 130 that facilitate the execution of computer-readable instructions to control the operations of the utility meter 120 and the maintenance and/or monitoring of the routing table 140. By executing computer-readable instructions, the utility meter 120 may include or form a special purpose computer that facilitates the identification of potentially invalid nodes within the mesh network.

In addition to one or more processor(s) 130, the utility meter 120 may include one or more memory devices 132, one or more network interface devices 134, and/or one or more sensors 136. The one or more memory devices 132 or memories may be any suitable memory devices, for example, caches, read-only memory devices, random access memory devices, magnetic storage devices, etc. The one or more memory devices 132 may store data, executable instructions, and/or various program modules utilized by the utility meter 120, for example, data files 138, the routing table 140, an operating system ("OS") 142, and/or an operations module 144 or operations application. The data files 138 may include, for example, information associated with the operation of the utility meter 120, location information associated with the utility meter 120, timing information associated with other mesh nodes in communication with the utility meter 120, information associated with identified changes in the routing table 140, information associated with generated alert messages, and/or data associated with measurements and/or readings taken by the utility meter 120.

The routing table 140 may include information associated with one or more other nodes in direct communication with the utility meter 120. For example, the routing table 140 may be a local routing table that includes information associated with the nearest neighbors of the utility meter 120 within the mesh network. In certain embodiments, the routing table 140 may be maintained by a network interface controller ("NIC") associated with the utility meter 120. In other embodiments, the routing table 140 may be maintained by a metrology board or a component that combines a NIC and a metrology board. As desired, the routing table 140 may be dynamically updated by the utility meter 120 based upon the identification of new nodes in communication with the utility meter 120 and/or based upon the identification of nodes that are no longer in communication with the utility meter 120. A wide variety of information associated with other nodes may be included in the routing table 140 as desired in various embodiments of the invention, such as names of other nodes, identifiers of other nodes, location information for other nodes, and/or timing information associated with communicating with other nodes (e.g., network delay and/or distances). Additionally, as desired, the routing table 140 may include information associated with a path to the mesh network controller 115. An example routing table 200 for the utility meter 120 is illustrated in FIG. 2. As shown in the routing table 200 of FIG. 2, the utility meter 120 is in communication with the second utility meter 120b, the third utility meter 120c, the fourth utility meter 120d, and the fifth utility meter 120e.

In certain embodiments of the invention, the utility meter 120 may include any number of software applications or modules that are executed to facilitate the operations of the utility meter 120. The software applications may include computer-readable instructions that are executable by the one or more processors 130. The execution of the computer-readable instructions may form a special purpose computer that facilitates the operations of the utility meter 120 as well as the identification and processing of changes in the routing table 140. As an example of a software application, the utility meter 120 may optionally include an operating system ("OS") 142 that controls the general operation of the utility meter 120 and that facilitates the execution of additional software applications.

Additionally, the utility meter 120 may include an operations module 144 or operations applications. The operations module 144 may be a suitable software module configured to facilitate the receipt and processing of measurements data and/or the communication of messages within the mesh network 105. In operation, the operations module 144 may receive measurements data from the sensors 136, and the operations module 144 may process the received measurements data. As desired, any number of messages associated with the measurements data, such as usage messages, may be generated and output for communication to the head end computers 110.

According to an aspect of the invention, the operations module 144 may monitor the routing table 140 and identify changes in the routing table 140. For example, the operations module 144 may identify one or more new nodes in communication with the utility meter 120 that have been added to the routing table 140. As another example, the operations module 144 may identify the removal of a node from the routing table 140. In certain embodiments, a change in the routing table 140 may be identified subsequent to the identification of a relatively steady state or stable condition of the routing table 140. In this regard, changes may not be identified during relatively volatile time periods, such as an initial set-up period for the mesh network 105. As one example, a change may be identified following a determination that the routing table 140 has not changed for a predetermined period of time, such as a week or some other period of time.

Following the identification of a change in the routing table 140, the operations module 144 may generate an alert message associated with the identified change. A wide variety of information may be included in the generated alert message as desired in various embodiments, including but not limited to, identification information for the utility meter 120, identification information for the identified change (e.g., identifiers of one or more new nodes, identifiers of one or more removed nodes, etc.), location information for the utility meter 120, location information for a new node, and/or timing information associated with communications between the utility meter 120 and a new node. In certain embodiments, the operations module 144 may direct the output of the generated alert message for communication to the mesh network controller 115 and/or the head end computer 110 via the mesh network 105 (or other suitable network). As explained in greater detail below, a recipient may process the alert message in order to determine whether any invalid nodes are present within the mesh network 105. One example of the operations that may be performed by the operations module 144 is described in greater detail below with reference to FIG. 3.

The one or more network interface devices 134 may facilitate connection of the utility meter 120 to any number of suitable networks, such as the mesh network 105. In this regard, the utility meter 120 may receive data from and/or communicate data to other components of the system 100. In certain embodiments, the network interface devices 134 may include a mesh radio configured to communicate with the mesh network 105. The radio may transmit, receive, and forward messages to other nodes of the mesh network 105. As desired, any number of suitable communications cards may be utilized as an interface between the radio and the processors 130. Additionally, as desired in certain embodiments, the network interface devices 134 may include any suitable communications interfaces, network cards, and/or other devices configured to communicate with the head end computers 110 via any number of wide area networks. For example, the network interface devices 134 may include cellular transceivers, broadband over power line adaptors, and/or other devices.

The one or more sensors 136 may include any suitable sensor devices configured to collect measurements data associated with the operation of the utility meter 120. For example, the sensors 136 may include voltage sensors, current sensors, variable ampere reactive sensors, flow sensors, and/or other suitable devices configured to collect readings and/or other measurements. In this regard, usage data may be collected by the utility meter 120 for processing and/or output.

With continued reference to FIG. 1, the mesh network controller 115 may be a suitable processor-driven device configured to function as an interface between the mesh network 105 and the networks 125 that facilitate communication with the head end computers 110. As such, the mesh network controller 115 may include components similar to those described for the utility meter 120 and/or the head end computers 110. For example, the mesh network controller 115 may include one or more processors, one or more memories, and/or one or more network interface devices. In operation, the mesh network controller 115 may receive messages from the utility meters via the mesh network 105, and the mesh network controller 115 may selectively communicate the received messages to the head end computers 110 via the wide area networks 125. Communications may be routed from the head end computers 110 to the meters in a similar manner.

As one example, the mesh network controller 115 may receive an alert message from a utility meter 120. In certain embodiments, the mesh network controller 115 may forward the received alert message to the head end computers 110 for processing. In other embodiments, the mesh network controller 115 may process the received alert message in order to determine whether the message will be escalated and communicated to the head end computers 110. For example, the mesh network controller 115 may analyze or evaluate the alert message in order to determine whether an identified change is a scheduled or expected change within the mesh network 105. As one example, the mesh network controller 115 may access received and/or stored information associated with expected node additions and/or removals, and the mesh network controller 115 may determine whether an identified change is an expected change based upon a comparison of information included in the alert message to at least a portion of the accessed information. If it is determined that the change is not a scheduled or expected change, then the mesh network controller 115 may escalate the alert message and communicate the message to the head end computers 110.

Additionally, in certain embodiments, the mesh network controller 115 may function as an aggregator or collector of information and/or messages within the mesh network 105. For example, the mesh network controller 115 may collect alert messages received from a plurality of nodes within the mesh network 105, and the mesh network controller 115 may communicate an aggregated message associated with the collected alert messages to the head end computers 110. In this regard, multiple alert messages associated with a single identified change within the mesh network 105 may be aggregated.

With continued reference to FIG. 1, the head end computers 110 or central controller may form or be a part of a suitable system associated with a local utility, such as a power substation operable to provide power to a power grid to which the utility meters are connected. A head end computer 110 may include any number of suitable computer processing components that facilitate the receipt and processing of alert messages and/or the communication of data and/or instructions to any number of utility meters. Examples of suitable processing devices that may be incorporated into a head end computer 110 include, but are not limited to, application-specific circuits, microcontrollers, minicomputers, personal computers, servers, other computing devices, and the like. As such, a head end computer 110 may include any number of processors 150 that facilitate the execution of computer-readable instructions to control the operations of the head end computers 110. By executing computer-readable instructions, the head end computer 110 may include or form a special purpose computer that facilitates the receipt and processing of alert messages in order to identify invalid nodes within the mesh network 105.

In addition to one or more processor(s) 150, the head end computer 110 may include one or more memory devices 152, one or more network interface devices 154, and/or one or more input/output ("I/O") interfaces 156. The one or more memory devices 152 or memories may be any suitable memory devices, for example, caches, read-only memory devices, random access memory devices, magnetic storage devices, etc. The one or more memory devices 152 may store data, executable instructions, and/or various program modules utilized by the head end computer 110, for example, data files 158, an operating system ("OS") 160, and/or an administration module 162 or administration application. The data files 158 may include stored data associated with the operation of the head end computer 110, information associated with received alert messages, information associated with identified invalid nodes, and/or information associated with control actions taken by the head end computer 110.

The OS 160 may be a suitable software module or application that executes computer-executable instructions to control the general operation of the head end computer 110 and to facilitate the execution of additional software applications. The administration module 162 may be a suitable software module or application that executes computer-executable instructions to facilitate administration of any number of mesh networks and/or utility meters. In this regard, the administration module 162 may be configured to receive and process data output by utility meters and/or mesh network controllers, such as measurements data, status messages, and/or alert messages. The administration module 162 may additionally be configured to communicate messages, instructions, and/or updates to the utility meters and/or the mesh network controllers.

According to an aspect of the invention, the administration module 162 may be configured to receive and process one or more alert messages associated with identified changes in the routing tables of one or more utility meters. Based upon an analysis of the received alert messages, the administration module 162 may identify invalid nodes within the mesh network 105. As desired, the administration module 162 may additionally identify a location or approximate location for an invalid node. A wide variety of suitable techniques and/or methods may be utilized as desired to identify a location or approximate location for an invalid node. As one example, radio triangulation may be utilized to identify an approximate location for an invalid node. As another example, alerts received from multiple meters that are within radio range of an invalid node may be processed in order to approximate a position of the invalid node. As yet another example, communications packet latencies between the invalid node and one or more nodes that generated alert messages may be evaluated in order to determine an approximate distance between the reporting nodes and the invalid node. These approximate distances may then be evaluated in order to approximate a location of the invalid node. Similarly, signal strength measurements for the invalid node that are taken by and received from one or more nodes that generated alert messages may be processed to determine an approximate location of the invalid node.

Once an invalid node has been identified, the administration module 162 may direct or trigger the execution of any number of control actions associated with the invalid node. In this regard, the administration module 162 may enhance security within the mesh network 105. One example of the operations that may be performed by the administration module 162 is described in greater detail below with reference to FIG. 3.

With continued reference to the head end computer 110, the one or more network interface devices 154 may facilitate connection of the head end computer 110 to one or more wide area networks 125. In this regard, the head end computer 110 may receive data from and/or communicate data to other components of the system 100, such as the mesh network controller 115 and/or other components configured to communicate via the networks 125. Additionally, the one or more 110 interfaces 156 may facilitate communication between the head end computer 110 and one or more input/output devices, for example, one or more user interface devices, such as a display, keypad, control panel, touch screen display, remote control, microphone, etc., that facilitate user interaction with the head end computer 110.

The one or more networks 125 may include any number of suitable networks that facilitate communications between the various components of the system 100, such as the head end computers 110 and the mesh network controller 115. For example, the one or more networks 125 may include, any number of suitable wide area networks, such as the Internet, a cellular network, a broadband over power line network, a satellite-based network, etc. In certain embodiments, the one or more networks 125 may be part of an AMI network.

As desired, embodiments of the invention may include a system 100 with more or less than the components illustrated in FIG. 1. Additionally, certain components of the system 100 may be combined in various embodiments of the invention. For example, certain functionality described for the mesh network controller 115 and the head end computers 110 may be combined within a single device. The system 100 of FIG. 1 is provided by way of example only.

FIG. 3 is a flow diagram illustrating one example method 300 for identifying an invalid node within a mesh network, according to an illustrative embodiment of the invention. The method may be utilized in association with one or more mesh network systems and/or utility systems, such as the system 100 illustrated in FIG. 1. In certain embodiments, the operations of the method 300 may be performed by at least one utility meter and a head end computer or central controller, such as the utility meter 120 and central controller 110 or head end computer illustrated in FIG. 1.

The method 300 may begin at block 305. At block 305, the utility meter 120 may generate a routing table that includes information associated with other nodes connected to the utility meter 120 within a mesh network, such as the mesh network 105 illustrated in FIG. 1. For example, the routing table may include information associated with other nodes that are in direct communication with the utility meter 120, such as other nodes that are relatively close to the utility meter 120. A wide variety of information may be stored in the routing table as desired in various embodiments, such as identification information for other nodes, location information for other nodes, and/or communication delay information associated with other nodes (e.g., a transmission time for communicating a message to another node and/or for receiving a message or response from the other node). In certain embodiments, the routing table may be dynamically updated by the utility meter 120 based upon the identification of new nodes and/or the identification of nodes that are no longer in communication with the utility meter.

At block 310, the routing table may be monitored by the utility meter 120 in order to determine whether any changes in the routing table occur. For example, once the routing table has been generated or built, the routing table may be monitored based upon the identification of the connected nodes. In certain embodiments, the routing table may be monitored following the identification of a relatively stable or steady state condition within the routing table. It may be assumed that a metering network should remain static once it has been established. Accordingly, any change following the establishment of the metering network and the achievement of a steady state condition may be indicative of an invalid node. A wide variety of suitable methods and/or techniques may be utilized to identify a steady state condition. For example, a steady state condition may be identified based upon the passage of a predetermined period of time following the identification of a last change within a routing table. As another example, a steady state condition may be identified based upon the receipt of a message from a mesh network controller or the head end computer 110.

At block 315, a determination may be made as to whether a change in the routing table has been identified. For example, a determination may be made as to whether one or more new nodes have been added to the routing table. As another example, a determination may be made as to whether one or more nodes have been removed from the routing table. If it is determined at block 315 that no change has been identified, then operations may continue at block 310 described above, and the routing table may continue to be monitored however, it is determined at block 315 that a change has been identified, then operations may continue at block 320.

At block 320, an alert message associated with the identified change may be generated. A wide variety of information may be included in the alert message, such as an identifier of the utility meter 120, identifiers of one or more other nodes associated with the change (e.g., an identifier of a new node that has been identified, etc.), location information for the utility meter 120, and/or location information and/or timing information associated with the one or more other nodes (e.g., a new node that has been identified, etc.). At block 325, the generated alert message may be output for communication to one or more recipients, such as to a head end administration system or head end computer 110 and/or to a mesh network gate. In certain embodiments, the alert message may be communicated to a mesh network gate via the mesh network 105, and the mesh network gate may communicate the alert message or information included in the alert message to the head end computer 110. As desired, the mesh network gate may process the alert message prior to communicating the alert message to the head end computer 110. For example, the mesh network gate may perform certain operations that are described below as being performed by the head end computer 110, such as a determination of whether an identified change is a scheduled or expected change. In other embodiments, the alert message may be communicated directly to the head end computer 110 by the utility meter 120.

At block 330, the head end computer 110 may receive the alert message output by the utility meter 120. Alternatively, the head end computer 110 may receive information associated with the alert message that is output by a mesh network controller. At block 335, stored node deployment and/or node change information may be accessed or otherwise obtained. For example, scheduled node deployment information may be obtained from memory or from an external data source. As another example, scheduled maintenance information may be obtained from memory or from an external data source. The obtained information may include information associated with scheduled, expected, and/or known changes within the mesh network 105.

At block 340, a determination may be made as to whether a change identified by an alert message is a scheduled or expected change. For example, a determination may be made as to whether an identified new node within the mesh network is a new node scheduled for deployment and/or initialization by a utility provider. In certain embodiments, the determination may be based on a comparison of at least a portion of the information included in the alert message to at least a portion of the accessed or obtained information. For example, an identifier of a newly identified node included in an alert message may be compared to one or more accessed identifiers for scheduled node deployments. As another example, an identifier of a node that has been removed from the mesh network may be compared to one or more accessed identifiers associated with scheduled maintenance and, or reported node failures. If it is determined at block 340 that the identified change associated with the alert message is an expected change, then operations of the method 300 may end, if, however, it is determined at block 340 that the identified change is not an expected change, then operations may continue at block 345.

At block 345, a new or changed node within the mesh network may be identified as an invalid node. For example, a node that has been added to the mesh network may be identified as an invalid node in certain embodiments, the new node may be identified based upon the receipt of a plurality of alert messages. For example, multiple utility meters in communication with the new node may generate respective alert messages that are processed to identify a new node. As another example, a node that has been moved without authorization may be identified. For example, in the event that the majority or entirety of a routing table has been changed, then a determination may be made that a node has been improperly moved. Additionally, the processing of alert messages received from other nodes and identifying the removal of a node from a routing table may facilitate the identification of a node that has been improperly moved indeed, a wide variety of methods and/or techniques may be utilized to facilitate the identification of an invalid node within a mesh network.

At block 350, which may be optional in certain embodiments of the invention, one or more requests for location information associated with an invalid node may be output by the head end computer 110 for communication to one or more utility meters within the mesh network 105, such as utility meters that generated alert messages associated with the invalid node. A utility meter 120 may receive a request for location information at block 355, and location information may be communicated to the head end computer 110 at block 360. Location information may be received by the head end computer 110 from any number of utility meters at block 365.

As an alternative to requesting location information, location information may be included in one or more alert messages and identified by the head end computer 110. A wide variety of location information may be received by the head end computer 110, such as locations (e.g., global positioning coordinates, stored locations, street addresses, etc.) of one or more utility meters that identified routing table changes, location information for an invalid node (e.g., positional information determined by the utility meters for the invalid node), and/or timing information associated with communications between the utility meters and the invalid node.

At block 370, a position or location of the invalid node (e.g., new node, changed node, etc.) may be determined, calculated, or approximated by the head end controller. A wide variety of suitable techniques may be utilized to determine a position of an invalid node. As one example, radio triangulation may be utilized to determine a position of an invalid node. For example, the positions of utility meters that identified the invalid node may be utilized in conjunction with timing information, such as message response time between one or more of the utility meters and the invalid node, in order to extrapolate an estimated position for the invalid node. In this regard, the location, of invalid nodes and the potential security risks within the mesh network 105 may be determined.

At block 375, any number of control actions may be directed by the head end computer 110. A control action may be any suitable action intended to minimize or reduce the security risks with respect to an invalid node. For example, a control action may minimize the data that is potentially compromised by being communicated to an invalid node. A wide variety of different control actions may be utilized as desired in various embodiments of the invention. For example, the head end computer 110 may direct other nodes within the mesh network to not communicate messages to the invalid node. As another example, the head end computer 110 may direct the dispatch of a technician to the determined location of the invalid node.

The method 300 may end following either block 340 or block 375.

The operations described and shown in the method 300 of FIG. 3 may be carried out or performed in any suitable order as desired in various embodiments of the invention. Additionally, in certain embodiments, at least a portion of the operations may be carried out in parallel. Furthermore, in certain embodiments, less than or more than the operations described in FIG. 3 may be performed.

The invention is described above with reference to block and flow diagrams of systems, methods, apparatus, and/or computer program products according to example embodiments of the invention. It will be understood that one or more blocks of the block diagrams and flow diagrams, and combinations of blocks in the block diagrams and flow diagrams; respectively, can be implemented by computer-executable program instructions. Likewise, some blocks of the block diagrams and flow diagrams may not necessarily need to be performed in the order presented, or may not necessarily need to be performed at all according to some embodiments of the invention.

These computer-executable program instructions may be loaded onto a general purpose computer, a special purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block, or blocks. As an example, embodiments of the invention may provide for a computer program product, comprising a computer usable medium having, a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block, diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A utility meter, comprising: at least one network interface device configured to facilitate communication over a mesh network; at least one memory configured to store a routing table comprising information associated with one or more devices in communication with the utility meter via the mesh network; and at least one processor configured to (i) identify a change in the routing table, (ii) generate an alert message associated with the identified change, and (iii) direct communication of the alert message to a central controller, wherein the central controller is configured to process the alert message to identify an invalid node within the mesh network, and wherein the alert message is communicated, by the utility meter to a mesh network controller configured to (i) determine whether the change in the routing table matches an expected change, and (ii) direct the communication of the alert message to the central controller based upon a determination that the change in the routing table does not match the expected change.

2. The utility meter of claim 1, wherein the identified change in the routing table comprises one of (i) an addition of a node to the routing table or (ii) a removal of a node from the routing table.

3. The utility meter of claim 1, wherein the at least one processor is further configured to direct communication of location information to the central controller.

4. The utility meter of claim 3, wherein the at least one network interface device is further configured to receive a request for the location information, and
wherein the at least one processor is configured to direct the communication of the location information in response to receiving the request.

5. The utility meter of claim 3, wherein the location information comprises at least one of (i) a current position of the utility meter or (ii) information associated with the location of the invalid node.

6. The utility meter of claim 1, wherein the at least one processor is further configured to identify, prior to identifying a change in the routing table, a steady state condition associated with the routing table.

7. A method comprising: generating, by a utility meter, a routing table comprising information associated with one or more devices in communication with the utility meter via a mesh network; identifying, by the utility meter, a change in the routing table; generating, by the utility meter, an alert message associated with the identified change; and outputting, by the utility meter for communication to a central controller, the generated alert message, wherein the central controller is configured to process the alert message to identify an invalid node within the mesh network, and wherein outputting the generated alert message comprises outputting the alert message for communication to a mesh network controller configured to (i) determine whether the change in the routing table matches an expected change, and (ii) direct the communication of the alert message to the central controller based upon a determination that the change in the routing table does not match the expected change.

8. The method of claim 7, wherein identifying a change in the routing table comprises identifying one of (i) an addition of a node to the routing table or (ii) a removal of a node from the routing table.

9. The method claim 7, further comprising:
outputting, by the utility meter for communication to the central controller, location information.

10. The method of claim 9, further comprising:
receiving, by the utility meter, a request for the location information,
wherein outputting the location information comprises outputting the location information in response to receiving the request.

11. The method of claim 9, wherein outputting location information comprises outputting at least one of (i) a current position of the utility meter or (ii) information associated with the location of the invalid node.

12. The method of claim 7, further comprising:
identifying, by the utility meter prior to identifying a change in the routing table, a steady state condition associated with the routing table.

13. A system, comprising:
a plurality of utility meters in communication with one another via a mesh network, each utility meter comprising a routing table configured to store information associated with other utility meters in the plurality of utility meters; and a central controller configured to (i) receive, from a first utility meter of the plurality of utility meters, an alert message associated with an identified change in the routing table of the first utility meter, and (ii) identify, based upon an analysis of the alert message, an invalid node associated with the mesh network, and wherein the central controller is further configured to (i) receive, from a second utility meter included in the plurality of meters, a second alert message associated with an identified change in the routing table of the second utility meter and (ii) identify the invalid node based upon an analysis of the first alert message and the second alert message.

14. The system of claim 13, wherein the central controller is further configured to (i) identify information associated with one or more expected changes within the mesh network, (ii) compare at least a portion of expected change information to the identified change associated with the alert message, and (iii) identify the invalid node based at least in part upon the comparison.

15. The system of claim 13, wherein the central controller is further configured to (i) receive, from the utility meter, location information and (ii) identify, based at least in part upon the received location information, a location of the invalid node.

16. The system of claim 13, wherein the central controller is further configured to identify a location of the invalid node based upon an analysis of the first alert message and the second alert message.

17. The system of claim 13, further comprising:

a mesh network controller configured to facilitate communication between the plurality of utility meters and the central controller.

* * * * *